INVENTORS.
JAMES J. VAN GOMPEL,
LUTHER W. MEYER,
BY Berman, Davidson & Berman
ATTORNEYS.

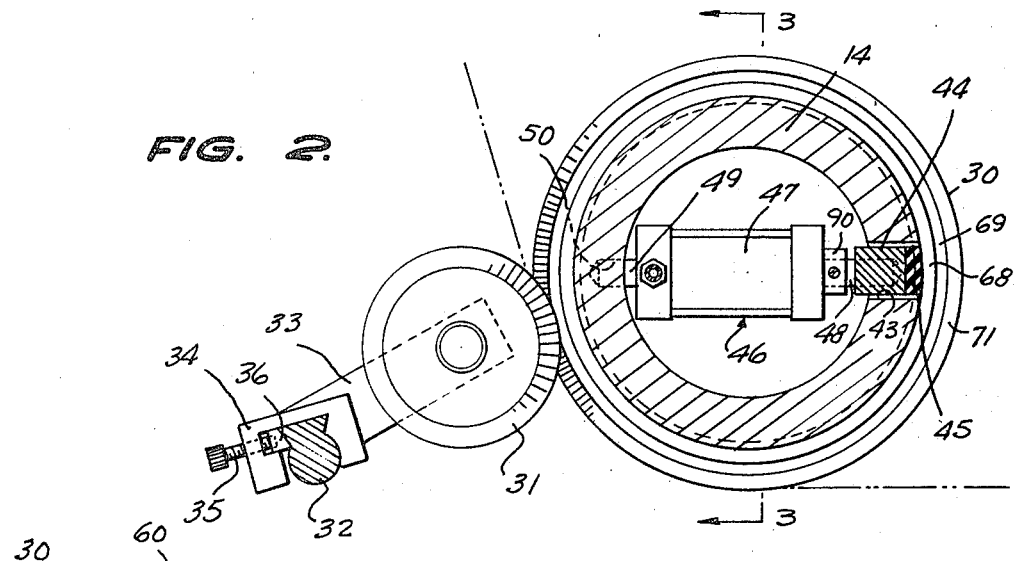
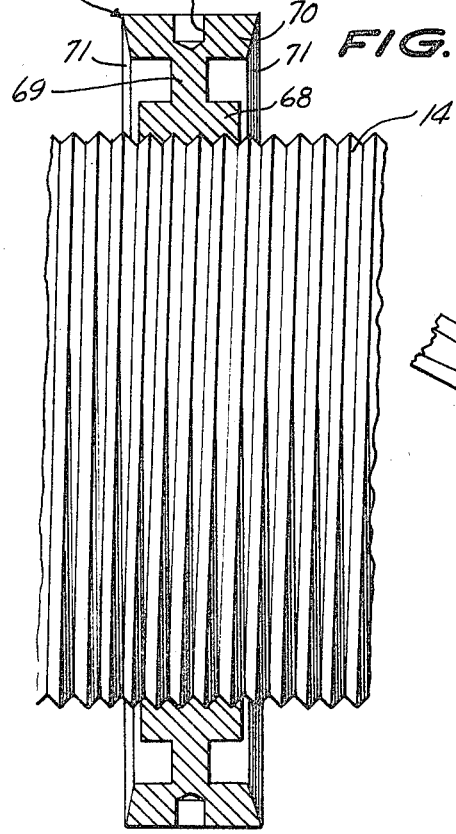
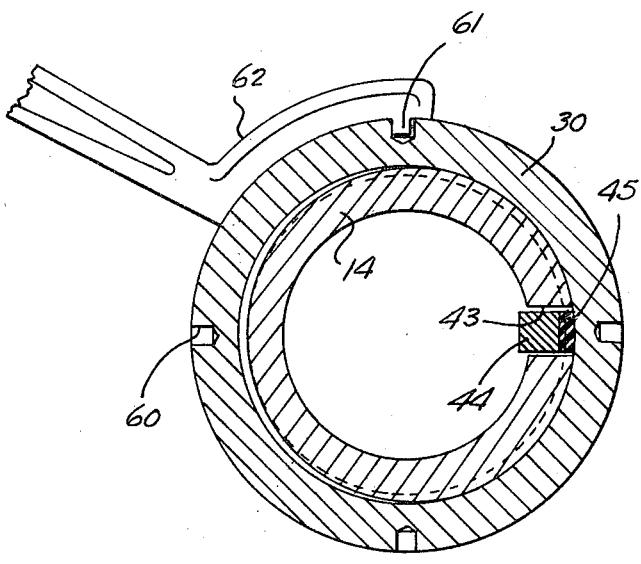
INVENTORS.
JAMES J. VAN GOMPEL,
LUTHER W. MEYER,
BY Berman, Davidson & Berman
ATTORNEYS.

3,422,714
QUICK-SET SHEAR SLITTER
James J. Van Gompel and Luther W. Meyer, Menasha, Wis., assignors to S & S Enterprises, Inc., Menasha, Wis., a corporation of Wisconsin
Filed Dec. 23, 1966, Ser. No. 604,239
U.S. Cl. 83—498                 10 Claims
Int. Cl. B26d 1/24, 1/14; B23d 19/06

This invention relates to cutting devices, and more particularly to improvements in machines for slitting paper or other materials.

A main object of the invention is to provide a novel and improved slitting assembly for use on high-speed machines for cutting paper and similar materials, the assembly involving relatively simple parts, being easy to adjust, and providing a high degree of accuracy of adjustment together with reliable securement of the desired adjustment for as long a period as is required.

A further object of the invention is to provide an improved adjustable slitting assembly for use on a high-speed paper-slitting machine or similar slitting machine, the slitting assembly involving relatively inexpensive components, and being easy to manipulate so that a relatively unskilled person can be employed to set up and adjust the assembly to provide the correct width desired in cutting paper and similar materials, the adjustment being able to be performed in a relatively short period of time and with a minimum amount of effort.

A still further object of the invention is to provide an improved adjustable slitting assembly for paper and similar materials, the assembly being adapted to be employed on a high-speed cutting machine, the slitting assembly having means for quickly making any necessary adjustments as to the width required to be cut, and being provided with reliable means for maintaining the desired width adjustments, the slitting assembly involving only a small number of parts, being relatively compact in size, and providing a considerable saving in time and labor in changing over from one cutting width to another, so that it is not necessary to shut down the associated cutting machine for any substantial period of time when changing over, and being relatively simple to adjust so that it is not necessary to employ specially-trained personnel in order to make the required changes in cutting width.

Further objects and advantages of the invention will become apparent from the following description and claims, and from the accompanying drawings, wherein:

FIGURE 2 is an enlarged transverse vertical cross-sectional view taken substantially on the line 2—2 of FIGURE 1.

FIGURE 3 is an enlarged fragmentary cross-sectional view taken substantially on the line 3—3 of FIGURE 2.

FIGURE 4 is an enlarged vertical cross-sectional view taken substantially on the line 4—4 of FIGURE 1 and showin gthe manner in which a spanner wrench may be employed to adjust one of the female slitter rings of the assembly.

Figure 1:
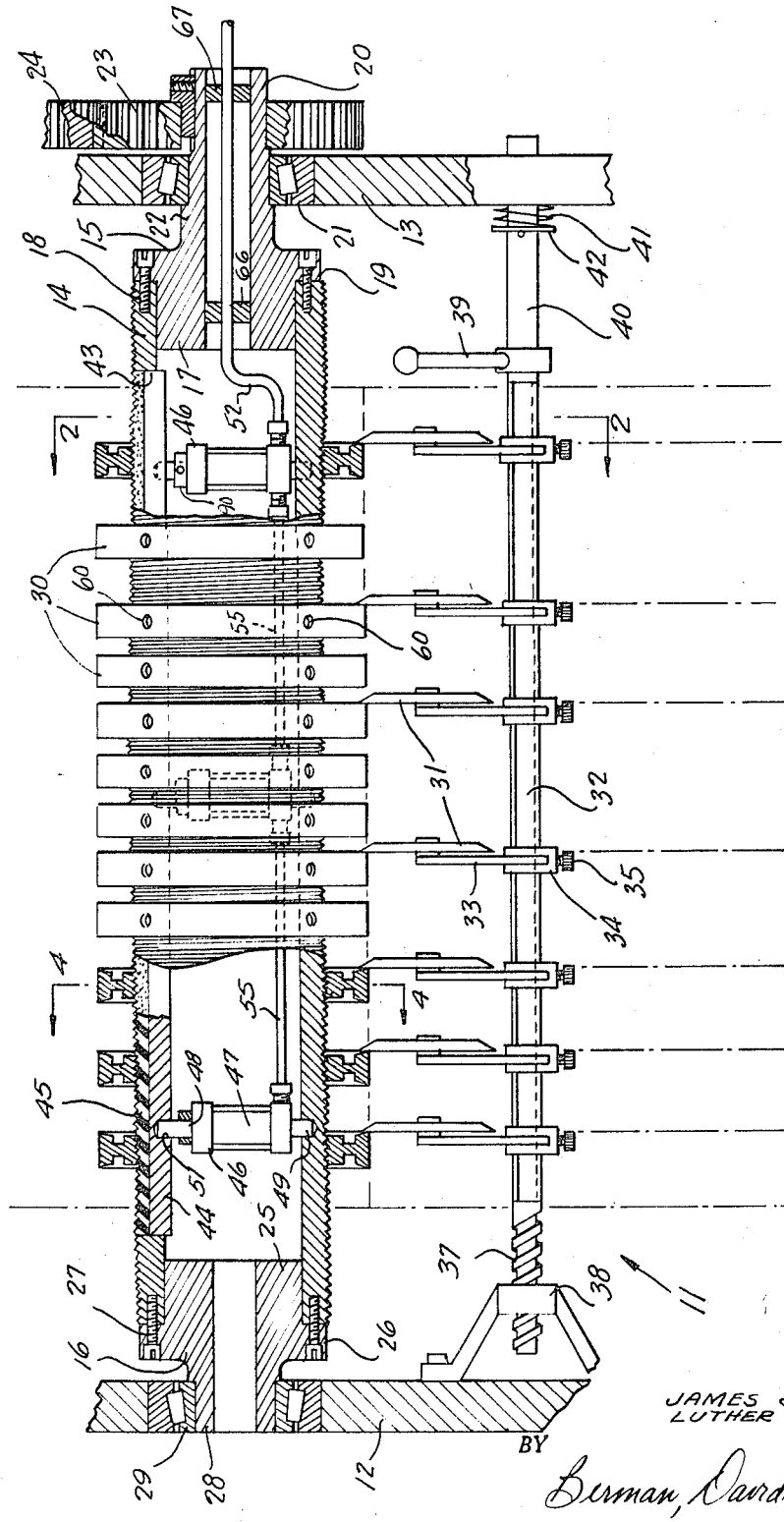
FIGURE 1 is a cross-sectional view, partly in elevation, of an improved adjustable slitting assembly constructed in accordance with the present invention, shown installed on the frame of a conventional paper-cutting machine.

Referring to the drawings, 11 generally designates an improved adjustable slitting assembly constructed in accordance with the present invention. The assembly 11 is adapted to be mounted between a pair of frame bars 12 and 13 of a conventional high-speed paper-slitting machine, or other conventional material-slitting machines. In the case of the conventional paper-slitting machine illustrated in FIGURE 1, it has been previously necessary, with conditions existing in the prior art, to shut down the machine for a considerable period of time in order to change over from one slitting width to another. In accordance with the prior art conditions, it has been necesary to have several slitter cylinders provided with various sizes of slitters, a particular cylinder being inserted in accordance with the requirements of a given order. Thus, the slitter assemblies of the prior art are not adjustable, and whenever a change-over is required from one width to another, the associated cutting machine must be shut down and the slitting assembly must be changed, namely, the slitting cylinder must be removed and must be replaced by another cylinder having slitter elements thereon spaced at the required new width. Furthermore, in the case of the slitter assemblies of the prior art, the female slitting elements thereon are held in place by set screws which are directed into a keyway extending across the entire length of the cylinder. This keyway becomes scored from all the various changes in position of the female slitter rings thereon, making it eventually difficult to accurately set a female slitter ring at a desired position on the cylinder, since the set screws tend to move into scores or deformations previously formed in the keyway. In many instances, these set screws re-seat themselves while the machine is running, causing large amounts of material to be slit to the wrong width, resulting in substantial losses of material and time, due to the necessity of re-setting the female slitters.

As will be presently pointed out, the improved slitting assembly of the present invention overcomes the disadvantages of the prior art slitter assemblies by providing means to readily adjust the positions of the famale slitter elements thereon and to reliably lock said female slitter elements in their newly-adjusted positions, whereby it is unnecessary to remove the assembly and replace it with another, as has been the case under the conditions existing in the prior art.

Again referring to the drawings, it will be seen that the assembly 11 comprises an externally-threaded main cylinder 14 having respective end caps 15 and 16 secured thereto, the end cap 15 having a reduced annular flange 17 engaged in one end of the cylinder 14 and secured thereto by bolts 18 extending through the annular shoulder 19 thereof and threadedly-engaged in the rim of the cylinder 14. The end cap 15 has a hollow shank portion 20 rotatably-supported by means of a bearing assembly 21 in the frame portion 13, said shank portion being of increased diameter at 22 to define an abutment shoulder engaging the inner race of the bearing assembly 21. The conventional drive gear 23 is rigidly-secured on the external portion of the hollow shaft element 20, the gear 23 being drivingly-engaged by a further driving gear 24 in the usual manner. The opposite end of the externally-threaded main cylinder 14 is provided with another cap which has an annular reduced portion 25 defining a shoulder element 26 through which fastening screws 27 are engaged and are threaded into the cylinder 14 to secure the cap 16 thereto. Cap 16 is provided with the hollow shaft portion 28 rotatably-received in the frame member 12 and rotatably-supported by a bearing assembly 29.

Designated at 30 are respective female slitter rings which are threadedly-engaged on the main cylinder 14 and which cooperate with male slitters 31 adjustably-mounted in a conventional manner on a supporting shaft 32 which extends parallel to the main cylinder 14. The shaft 32 is of dovetailed shape, as shown in FIGURE 2, and the male slitters 31 are provided with supporting bars 33 of spring metal which are rigidly-secured to clamping collars 34 slidably-engaged on the dovetailed portion of shaft 32, each collar member 34 being provided with a clamping screw 35 threaded through one leg of the collar member 34, as shown in FIGURE 2, the inner end of the clamping screw bearing against a clamping shoe 36 which is in frictional engagement with a side surface of the dovetailed portion of shaft 32. This arrangement provides for convenient and easy adjustments of the positions of the male slitters 31, as required. The shaft 31 is slidably-supported at one end in the frame element 13 and is provided at its other end with a steeply-pitched thread 37 which is threadedly-engaged in a bracket 38 secured to the opposite frame member 12. Shaft 32 is further provided with a release handle 39 adjacent the frame element 13. Normally, the male slitters 31 are substantially in shearing engagement with their associated female slitter rings 30, but can be rapidly disengaged therefrom by rotating the handle 39 in a direction to unscrew threaded portion 37 from bracket 38, thus enabling the male and female cutter elements to be disengaged from each other without damaging their sharp cutting edges. The resilient supporting bars 33 are preferably constructed of flat spring steel, so as to maintain a constant tension between the male and female cutting edges. The end portion 40 of shaft 32 opposite threaded portion 37 thereof is of circular cross-section and is rotatably and slidably-engaged in frame member 13. Suitable biasing means, such as a coiled spring 41 may be provided on shaft portion 40, bearing between frame member 13 and suitable collar means 42 on shaft portion 40, biasing the male cutters 41 toward operative engagement toward female cutters 30.

Main cylinder 14 is formed with a longitudinal slot 43 in which is slidably-positioned a longitudinal pressure bar 44 of relatively rigid material, such as metal, or the like. Secured on pressure bar 44 at its outer side is a pad 45 of somewhat deformable material, such as hard rubber, or the like, having a relatively high coefficient of friction. The pressure bar 44 and its associated pad 45 are normally urged outwardly into locking frictional engagement with the adjusted female cutter rings 30 by a plurality of hydraulic rams 46, each ram comprising a cylinder 47 provided with an extensible plunger 48. The rams are mounted at spaced locations in the interior of cylinder 14. The ram cylinders 47 are provided with axially-extending bottom positioning rods 49 which are engaged in recesses 50 provided therefor in the wall of cylinder 14 opposite slot 43. The external ends of the plungers 48 are similarly engaged in recesses 51 provided therefor in the pressure bar 44. Stop collars 90 are secured on plungers 48 to limit retraction of plungers 48 sufficiently to prevent bar 44 from dropping out of slot 43. As shown in FIGURE 1, the hydraulic rams 46 are arranged diametrically and at spaced locations inside the main cylinder 14, and the ends thereof opposite the pressure bar 44 are connected to a common supply conduit 52 leading through suitable rotating seal connections, not shown, to a source of hydraulic fluid under pressure. The hydraulic source is supplied with suitable control valve means, not shown, for controlling the supply of pressure fluid to the hydraulic rams 46. As shown in FIGURE 1, the base portions of the various ram cylinders are interconnected by suitable conduits 55 so that hydraulic fluid can be simultaneously admitted into the ram cylinders 47, whereby to simultaneously extend the plungers 48 and to urge the pressure bar 44 outwardly, causing the pad 45 to grip the rings 30 and to lock said rings in adjusted positions on the externally-threaded main cylinder 14. When the hydraulic fluid is released from the ram cylinders 47, the holding force of pad 45 against the rings 30 is released, allowing said rings to be rotated, as required for adjustment thereof.

As shown in FIGURE 4, the female slitter rings 30 are provided with spaced peripheral recesses 60 for engagement by the pin element 61 of a conventional spanner wrench 62, which may be engaged on the ring 30 in the manner illustrated in FIGURE 4, so that the spanner wrench 62 may be employed to rotate the ring 30 and to thus adjust its position on the main cylinder 14. Said adjustment is performed with the hydraulic fluid released from the ram cylinders 47, as above-explained. After the required adjustments have been performed, the rings 30 may be locked in their newly adjusted positions by re-admitting hydraulic fluid under pressure into the ram cylinders 47, whereby to force the pressure bar 44 outwardly and to move the pad 45 into gripping engagement with the rings 30.

Any suitable pressure fluid may be employed to operate the rams 46, for example, any suitable hydraulic liquid, such as oil, or the like, under pressure, or compressed air. The supply conduit 52 extends substantially axially through the central bore of the end member 15, being provided with suitable cushioning rings 66, 67, as shown in FIGURE 1, to absorb vibrations and shock.

As shown in FIGURE 3, each ring 30 comprises an internally-threaded base ring portion 68 whose threads engage on main cylinder 14, a radial web portion 69 and an outwardly-flaring annular rim 70 having opposite honed edges 71, 72. The spanner wrench recesses 60 may be four in number spaced at 90° from each other around the axis of the ring.

As above-mentioned, when readjustment of the female cutter rings 30 is required, the male cutters 31 are first backed off by rotating the arm 39, the male cutters 31 being held in retracted positions in any suitable manner, for example, by fastening arm 39 in its rotated position. The hydraulic fluid is then released from the rams 46, unlocking the rings 30. The rings 30 are then readjusted along the cylinder 14 to their desired new positions. The pressure fluid is then re-admitted into the ram cylinders 47, locking the rings in their newly adjusted positions. The male slitters 31 may then be re-adjusted in accordance with the new positions of their associated cooperating female cutter rings 30. With the male cutters 31 in engagement with their associated female cutter rings 30, the machine may be started up and a small sample of the stock may be slit and the resultant segments thereof may be measured for accuracy. If further adjustments of the rings 30 are required, the fluid pressure may be reduced sufficiently to allow enough relaxation of the outward force exerted by the pad 45 on the rings to permit the rings to be rotated, as required. The adjustment of each ring 30 must, of course, be made by means of a spanner wrench 62, as above-described. The adjustment of each ring 30 will, of course, not affect the adjustment of any of the other rings 30 on the cylinder 14.

When the final desired adjustments are obtained, full fluid pressure is re-admitted into the ram cylinders 47, locking the rings 30 in their finally-adjusted positions, and the machine is ready for steady operation. The female cutter rings 30 will remain in their adjusted positions as long as normal fluid pressure is maintained in the ram cylinders 47.

If so desired, a calibrated gauge rod can be positioned parallel to the cylinder 14 externally-adjacent to the rings 30. Since the threads on cylinder 14 are of known pitch, the amount of linear adjustment of the rings 30 will depend upon the degree of rotation of the rings. Thus, the amount of adjustment corresponding to the degree of rotation between two successive recesses 60 will be known. The above-mentioned gauge bar may be employed as a stationary index for adjusting the rings, since rotation of a ring through an angle corresponding to the spacing between two successive recesses 60 provides an accurately known degree of adjustment in the direction of the axis of cylinder 14.

While a specific embodiment of an improved slitting assembly for use on high-speed machines for cutting and similar materials has been disclosed in the foregoing description, various modifications within the spirit of the invention may occur to those skilled in the art. Therefore, it is intended that no limitations be placed on the invention except as defined by the scope of the appended claims.

What is claimed is:

1. In a slitting machine, a supporting frame, a supporting shaft, a plurality of male slitter blades adjustably-mounted on said supporting shaft and extending in planes substantially perpendicular to said shaft, a main cylinder rotatably-mounted on said frame substantially parallel to said supporting shaft, said main cylinder being formed with external threads, a plurality of female slitter rings threadedly-engaged on said cylinder and being operatively-engageable by said male slitter blades when rotated on the cylinder to adjusted positions wherein their side planes are adjacent the planes of the male slitter blades, and means movably-mounted in the cylinder and being lockingly-engageable with the female slitter rings to secure the rings in said adjusted positions.

2. The slitting machine of claim 1, and wherein said main cylinder is formed with a longitudinal slot intersecting said external threads and extending a substantial distance lengthwise of the cylinder and wherein said movably-mounted means comprises a longitudinal pressure bar assembly movably-disposed in said slot and being frictionally-engageable with said female slitter rings, and means in the cylinder to exert outward locking force on said pressure bar assembly.

3. The slitting machine of claim 2, and wherein said pressure bar assembly comprises a substantially rigid bar-like main body, and a relatively deformable friction pad on the outer longitudinal surface of said main body.

4. The slitting machine of claim 2, and wherein said means to exert outward locking force on the pressure bar assembly comprises expansible fluid pressure-operated means interposed between the pressure bar assembly and the opposite internal wall surface portion of the main cylinder.

5. The slitting machine of claim 4, and wherein said fluid pressure-operated means comprises at least one fluid-pressure cylinder operatively-mounted between the pressure bar assembly and said opposite internal wall surface portion of the main cylinder.

6. The slitting machine of claim 4, and wherein said fluid pressure-operated means comprises a plurality of fluid-pressure cylinders spaced longitudinally in and diametrically-disposed in said main cylinder and being operatively-mounted between the pressure bar assembly and said opposite internal wall surface portion of the main cylinder.

7. The slitting machine of claim 2, and wherein said pressure bar assembly comprises a substantially rigid bar-like main body provided with a relatively deformable friction pad on its outer longitudinal surface, and wherein said means to exert outward locking force on the pressure bar assembly comprises expansible fluid pressure-operated means mounted between said bar-like main body and the opposite internal wall surface portion of the main cylinder.

8. The slitting machine of claim 7, and wherein said fluid pressure-operated means comprises a plurality of spaced fluid-pressure cylinder assemblies diametrically-mounted in the main cylinder and having cylinder portions drivingly-engaged with the wall of the main cylinder and having plunger portions drivingly-engaged with the rigid bar-like main body of the pressure bar assembly.

9. The slitting machine of claim 8, and wherein the peripheries of said female slitter rings are formed with spaced recesses adapted to be drivingly-engaged by an adjusting implement.

10. The slitting machine of claim 8, and wherein the external threads extend for substantially the full length of the main cylinder and wherein said longitudinal slot intersects the major portion of the threaded length of said main cylinder.

References Cited

UNITED STATES PATENTS

| | | | |
|---|---|---|---|
| 325,812 | 9/1885 | Bridgman | 83—499 |
| 2,699,338 | 1/1955 | Rue et al. | 83—665 X |
| 3,173,325 | 3/1965 | Warren et al. | 83—449 |
| 3,302,506 | 2/1967 | Turner et al. | 83—665 |

ANDREW R. JUHASZ, *Primary Examiner.*

FRANK T. YOST, *Assistant Examiner.*

U.S. Cl. X.R.

83—504, 665